US009519906B2

(12) United States Patent
Anisimov et al.

(10) Patent No.: US 9,519,906 B2
(45) Date of Patent: Dec. 13, 2016

(54) METHOD FOR MONITORING AND RANKING WEB VISITORS AND SOLICITING HIGHER RANKED VISITORS TO ENGAGE IN LIVE ASSISTANCE

(75) Inventors: Nikolay Anisimov, Concord, CA (US); Mark Scott, Willowdale (CA); Yevgeniy Petrovykh, Walnut Creek, CA (US); Yi Chang, Saratoga, CA (US)

(73) Assignee: Genesys Telecommunications Laboratories, Inc., Daly City, CA (US)

(*) Notice: Subject to any disclaimer, the term of this patent is extended or adjusted under 35 U.S.C. 154(b) by 406 days.

(21) Appl. No.: 12/339,937

(22) Filed: Dec. 19, 2008

(65) Prior Publication Data

US 2010/0161540 A1    Jun. 24, 2010

(51) Int. Cl.
   *G06F 7/00*   (2006.01)
   *G06F 17/30*  (2006.01)
   *G06Q 30/02*  (2012.01)

(52) U.S. Cl.
   CPC .................................... *G06Q 30/02* (2013.01)

(58) Field of Classification Search
   USPC .......................................................... 706/47
   See application file for complete search history.

(56) References Cited

U.S. PATENT DOCUMENTS

| | | | | |
|---|---|---|---|---|
| 8,499,247 | B2* | 7/2013 | Niyogi et al. | 715/753 |
| 2002/0062245 | A1* | 5/2002 | Niu et al. | 705/14 |
| 2002/0165914 | A1 | 11/2002 | Kameoka et al. | |
| 2004/0139192 | A1 | 7/2004 | Spaid | |
| 2004/0190448 | A1* | 9/2004 | Fishteyn et al. | 370/229 |
| 2005/0188318 | A1* | 8/2005 | Tamir | G06F 11/3438 715/744 |
| 2006/0015390 | A1* | 1/2006 | Rijsinghani | G06F 17/3089 705/7.29 |
| 2006/0271671 | A1 | 11/2006 | Hansen | |

(Continued)

FOREIGN PATENT DOCUMENTS

| | | |
|---|---|---|
| JP | 2001-265977 A | 9/2001 |
| JP | 2001265977 A | 9/2001 |

(Continued)

OTHER PUBLICATIONS

Chinese Office Action, with English Translation, dated Jun. 25, 2013, for Application No. 200980151486.6, 12 pages.

(Continued)

*Primary Examiner* — Tuan A Pham
(74) *Attorney, Agent, or Firm* — Lewis Roca Rothgerber Christie LLP

(57) ABSTRACT

A ranking system ranks visitors to a Web site using one or more instances of machine-readable code executable from a digital medium accessible to a Web server. The code tracks visitor behavior while browsing the web site, and a visitor ranking module resident on the digital medium accepts information documented by the one or more instances of machine readable code and assigns rank values to one or more of the visitors. The ranking module ranks visitors at the Web-site based on logic and rules for interpreting visitor behavior and for applies a value to the visitor in real time based on that interpretation, and values applied at or above a preprogrammed level trigger solicitation of the visitor so ranked to engage in interaction including live assistance.

14 Claims, 6 Drawing Sheets

(56) References Cited

U.S. PATENT DOCUMENTS

| | | | |
|---|---|---|---|
| 2007/0116239 A1* | 5/2007 | Jacobi | H04M 3/5191 379/265.02 |
| 2008/0040341 A1* | 2/2008 | York et al. | 707/5 |
| 2008/0059444 A1* | 3/2008 | Singh et al. | 707/4 |
| 2008/0162701 A1 | 7/2008 | Ryabchun et al. | |
| 2008/0306830 A1* | 12/2008 | Lasa | G06Q 30/02 705/14.16 |

FOREIGN PATENT DOCUMENTS

| | | |
|---|---|---|
| JP | 200387421 A | 3/2002 |
| JP | 2002-197257 | 7/2002 |
| JP | 2002197257 A | 7/2002 |
| JP | 2002-334248 A | 11/2002 |
| JP | 2002334248 A | 11/2002 |
| JP | 2003-087421 | 3/2003 |

OTHER PUBLICATIONS

International Search Report and Written Opinion mailed Jul. 15, 2010 for International Application No. PCT/US2009/067436, 7 pages.

KIPO Office Action dated Aug. 14, 2012 for Korean Patent Application No. 10-2011-7016735 and English Translation, 7 pages.

KIPO Office Action dated Jun. 13, 2013 for Korean Patent Application No. 10-2011-7016735 and English Translation, 6 pages.

Chinese Office Action dated Feb. 4, 2015 for Chinese Patent Application No. 200980151486.6 and English Translation, 11, pages.

Japanese Office Action, with English translation, dated Jan. 16, 2013, for Application No. 2011-542263, 5 pages.

Chinese Office Action dated Feb. 4, 2015 for Chinese Patent Application No. 200980151486.6 and English Translation, 11 pages.

Chinese Office Action, with English Translation, dated Jun. 25, 2013, for CN Application No. 200980151486.6, 12 pages.

Chinese Patent Office Board Opinion dated Dec. 10, 2015 for CN Application No. 200980151486.6 and English Translation, 5 pages.

International Search Report and Written Opinion mailed Jul. 15, 2010 for Application No. PCT/US2009/067436, 7 pages.

Japanese Office Action, with English Translation, dated Jan. 16, 2013, for JP Application No. 2011-54263, 5 pages.

Korean Office Action dated Aug. 14, 2012 for Korean Patent Application No. 10-2011-7016735 and English Translation, 7 pages.

Korean Office Action dated Jun. 13, 2013 for Korean Patent Application No. 10-2011-7016735 and English Translation, 6 pages.

\* cited by examiner

METHOD FOR MONITORING AND RANKING WEB VISITORS AND SOLICITING HIGHER RANKED VISITORS TO ENGAGE IN LIVE ASSISTANCE

BACKGROUND OF THE INVENTION

1. Field of the Invention

The present invention is in the field of telecommunications including electronic commerce (ecommerce) and electronic services (eServices) and pertains particularly to methods and apparatus for monitoring web sessions initiated by visitors and ranking those sessions based on visitor navigation and interaction behavior for the purpose of proactively engaging higher ranked visitors into a live channel of communication.

2. Discussion of the State of the Art

In the field of electronic commerce, companies provide Web sites where visitors may, using Internet-capable appliances, browse products, services, and interactive features designed to engage customers in a way that may promote sales through those Web sites or through separate channels associated with those Web-sites. There are many different considerations visited to best determine when a particular customer should be approached and solicited. Therefore, many companies have pre-screening or qualification routines in place that basically work to screen out uninterested persons from taxing the sales process or to direct less interested parties at least to automated self-help systems so that live sales personnel are best utilized in assisting the more highly motivated and qualified potential customers.

The time of the agent is the most valuable asset of most contact center systems. Where Web services are in place, there are available widgets that can be provided on Web sites that allow customers to place calls, enter chat rooms, schedule call-backs and the like so that live assistance is always close at hand. However, many potential customers that elect live assistance are not actually highly motivated customers. They may elect live assistance when they are merely seeking information or to complain about a product or service, for example. As a result, a lot of time is wasted engaging potential customers that are not qualified or motivated at the time of engagement. In many of these cases redirection to an automated service is the suggested treatment to free up live personnel for better use of time.

Conversely, where automated sales transaction services are provided and available through an ecommerce Web-site, customers who are actively engaging those services should never be interrupted by live personnel unless there is a problem or obstacle preventing those customers from finishing the transaction.

It has occurred to the inventors that if a visitor navigating a Web site but not currently engaged in a transaction or utilizing live assistance can be identified as having motivation considered amenable to intervention, then live sales resources may be better utilized and sales through the Web-site might be enhanced over self-help pathways available through the site. What is clearly needed is a system and methods for proactively engaging Web-site visitors based on real-time visitor value ranking at the Web site.

SUMMARY OF THE INVENTION

A problem stated above is that it is desirable to be able to increase Web sales by proactively engaging Web visitors by methods in addition to self help routines. However, many of the conventional methods for engaging Web visitors navigating a Web site are static and not integrated with sophisticated business logic. The inventors therefore considered functional elements of a an ecommerce system and of a communication center looking for elements that exhibit compatibility that could potentially be harnessed to provide proactive engagement but in a manner that would not create distraction for Web visitors already engaged in a transaction through a Web site.

Every ecommerce Web site is driven by Web traffic one by-product of which is an abundance of visitors to the site that are not actually there to transact business. Most such Web sites employ some type of telephone and electronic correspondence and contact services in addition to traditional Web services including shopping cart pages, checkout counters, and so on. Infrastructure for handling off-page interactions are typically part of such structures.

The present inventor realized in an inventive moment that if, from the point of access, Web visitors could be effectively monitored and ranked according to importance to the sales process, significant sales increases might be realized through Web applications. The inventor therefore constructed a unique Web-based monitoring and ranking system that allowed visitors to be ranked according to browsing behavior of Web sites with higher ranked visitors invited to escalate their experience to a higher level. A significant increase of Web sales results with less unproductive downtime for call center agents.

Accordingly, in one embodiment of the invention a ranking system for ranking visitors to a Web site is provided, comprising one or more instances of machine-readable code executable from a digital medium accessible to a Web server, the code tracking visitor interaction behavior while browsing, and a visitor ranking module resident on the digital medium accepting information documented by the one or more instances of machine readable code and assigning rank values to one or more of the visitors. The ranking module ranks visitors at the Web-site based on logic and rules for interpreting visitor behavior and for applying a value to the visitor in real time based on that interpretation, and wherein values applied at or above a preprogrammed level trigger solicitation of the visitor so ranked to engage in interaction including live assistance.

In one embodiment the machine readable code is a tag and the Web site structure is hypertext markup language based. In another embodiment the machine readable code is a tag and the Web site structure includes Voice extensible Markup language based. In one embodiment the code documents attributes of the active session upon invocation thereof including visitor identification information and date and time information.

In one embodiment visitor behavior includes page presence, execution of an interactive feature, and or navigation of one or more tags in a sequence. In a variation of this embodiment visitor behavior is tracked on the Web site for a maximum amount of time that is less than the calculated average time a visitor spends at the Web site. In one embodiment the system further includes a data table stored on the digital medium accessible to the Web site, the data table adapted to store data reported by the code and a value assigned to the visitor by the ranking module. In a variation of this embodiment, the data table is a cache data table for storing temporary information including value rankings.

In one embodiment, different ranking values trigger solicitation of different types of engagement opportunities, the types included being limited only by the media capabilities and availability states of live agents of the entity actively servicing customers of the Web site. In one embodiment the method of solicitation to escalate an interaction is via a pop-up message or an audible message. In a preferred embodiment visitor acceptance of an escalation invitation begins an automated routing process.

According to another aspect of the invention, a method is provided for ranking individual visitors navigating a Web site to qualify them for live human-assisted interaction comprising the steps (a) using code embedded strategically in the structure of the Web-site, documenting activity information about visitors during visitor navigation of the site, (b) tabling the documented data, (c) based on logic and rules, ranking visitors, and (d) for each visitor with a value meeting threshold requirements, sending an invitation to that visitor to engage in a communication assisted by a live person.

In one aspect of the method at step (a) the code is JAVA script embedded in HTML or in VXML. In one aspect in step (a) the code includes pre-assigned values attributed to the portions of the site bearing the code the values reflecting the importance of presence at a portion of a site. In one aspect in step (b) the data tabled may include date, time, session identification, visitor identification, and rank values.

In one aspect in step (b) data for a visitor has a maximum time to live that is less than the calculated average time that visitors spend navigating the Web site. In one aspect in step (c) visitors are ranked according to one or a combination of presence, navigation string, execution of an interactive module, and profile data known about the visitor. In a one aspect in step (c) a ranking module ranks the visitors. In one aspect in step (d) the value is a sum of values accumulated during site navigation. In one aspect in step (d) the threshold requirements are that the value meet or exceed the threshold value, and wherein different values exceeding the threshold value are equated to different interaction modalities.

BRIEF DESCRIPTION OF THE DRAWING FIGURES

DETAILED DESCRIPTION

The inventors provide methods and a system that enables monitoring of Web site visitors and ranking navigation and interaction behavior with the site relative to a propensity for the visitor to acquiesce to the sales process offered through the site or that is associated with the site for the purpose of real-time escalation of the interactions of those visitors to higher level interactions including engagement of those visitors over communications channels featuring live assistance. The invention is described in enabling detail in the following embodiments.

Figure 1:
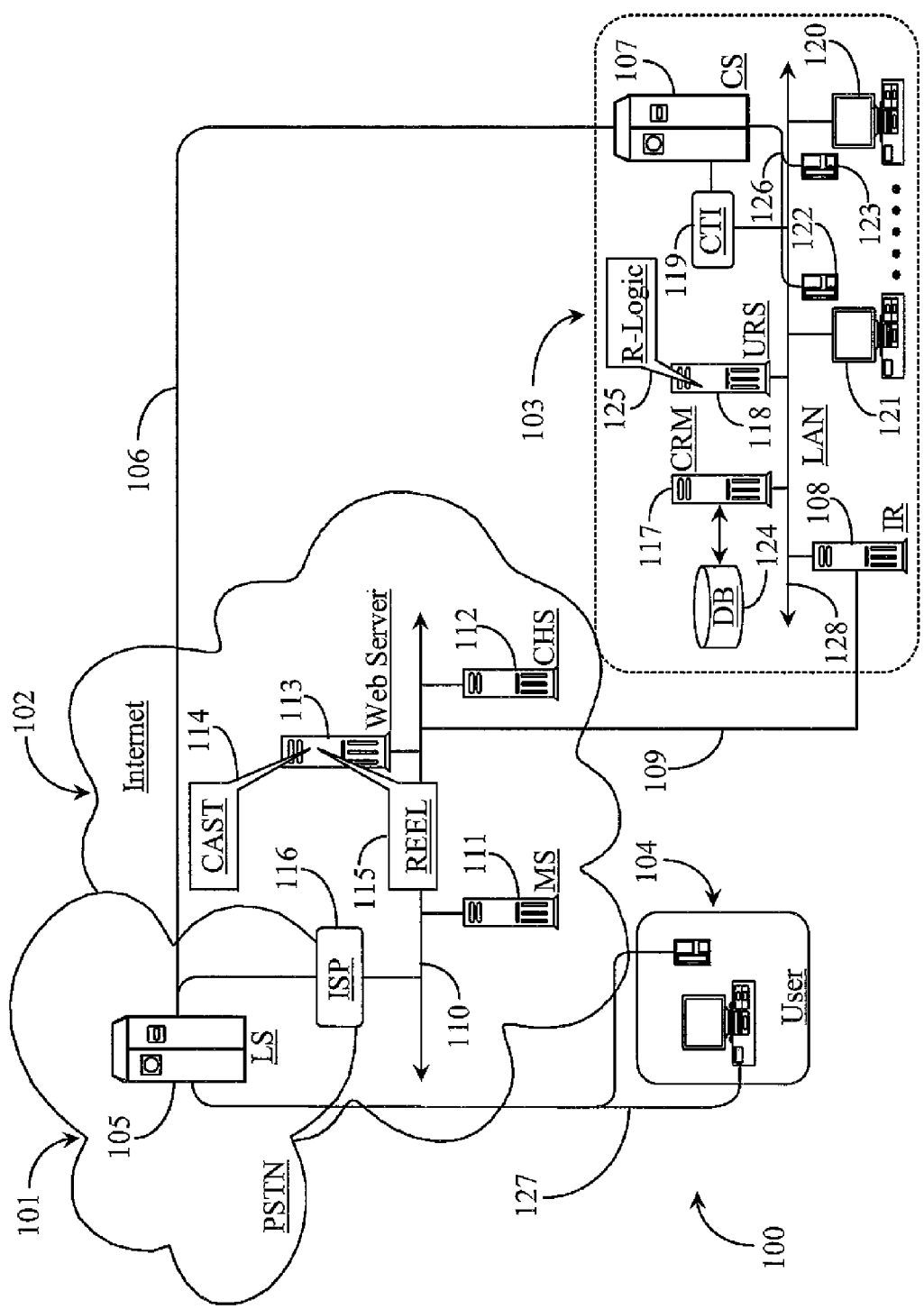
FIG. 1 is an architectural overview of a digital services and sales network supporting Web-site sale optimization according to an embodiment of the present invention.

FIG. 1 is an architectural overview of a digital services and sales network 100 supporting Web-site sale optimization according to an embodiment of the present invention. Network 100 is defined as a digital service and sales network because digital network architecture is leveraged as a network environment through which products and services can be reviewed and where transacting may be accomplished relative to the available products and services offered. Many different types of network architectures may be observed in this regard and may be considered for the purpose of enabling the invention. In this example, a wide area network (WAN) 102 is illustrated as a network through which introductions to potential customers of products and services are accomplished. In this example WAN 102 is the Internet network and will be referred to here and aft in this specification as Internet 102.

Internet 102 may be accessed via a telephony network such as the well-known public switched telephone network (PSTN) 101. Other access networks may also be considered such as a wireless digital cellular network, a digital satellite network, or some other connection network through which a potential customer operating an Internet capable appliance may gain access including Web TV-based applications. The PSTN network is illustrated here because of its high public access characteristic. It is well known that there are many methods of Internet access that are available.

For the purpose of discussion, a contact center 103 is illustrated in this example and represents third-party or on-site company contact services adapted to engage potential customers in the processes of sales and service. Contact center 103 may be adapted to process Internet-based transactions and service requests as well as telephone transactions and service requests leveraging appropriate computer telephony integrated (CTI) equipment and software capabilities.

Internet network 102 is further illustrated in this embodiment by a network backbone 110 that is intended to represent all of the lines, equipment, and access points that make up the Internet network as a whole. Therefore, there are no geographic limitations to practicing the present invention. A Web server (WS) 113 is illustrated within Internet 102 and is connected to backbone 110. WS 113 is adapted as an ecommerce Web-site server and has a digital medium installed thereon or associated therewith adapted to contain ecommerce Web-pages, and other interactive utilities created for the purpose of engaging potential customers whom access the server over the Internet. WS 113 may be hosted and maintained by a company offering third-party Web-site hosting services. In one embodiment, server 113 is owned and maintained by a single company offering products and services.

A user premise 104 is illustrated in this example and represents a potential consumer or customer that may access Internet 102 and may navigate to a Web-site hosted in WS 113 by operating an Internet capable appliance, in this case, a desktop computer running a network browser adapted for Hypertext Transfer Protocol (HTTP). Web-site access is typically accomplished in this example through exertion of a universal resource locator (URL) via the browser application. Server 113 serves Web pages of the Web-site identified by URL in the form of Hypertext Markup Language (HTML) pages or a compatible derivative that may be interpreted by a browser for system display and interaction.

A typical ecommerce Web-site includes multiple navigable HTML pages. One with skill in the art of network navigation will agree that other transfer protocols and markup languages may be observed relative to Web site navigation by an Internet connected user.

User 104 accesses WS 113 in Internet 102 via an Internet access telephone line 127 connected to a local telephony switch 105 and an Internet service provider (ISP) 116 connected to backbone 110. In this example a dial-up connection method is illustrated but one with skill in the art will appreciate that other connection types and networks may be utilized. For example, a broadband connection may be provided through a cable network or satellite network. In one embodiment the connection may be a wireless Internet connection established through a wireless fidelity (WiFi) network. User premise 104 also includes a standard telephone connected to switch 105 by the same service line 127.

In typical practice the user at premise 104 connects to the Internet through ISP 116 and then connects to server 113 by exerting a URL pointing to a Web site on that server. The main or start page of the Web site is typically served and is displayed at the interface of the user (desktop) at premise 104. The start page or home page includes all of the required hyperlinks to the other HTML pages of the Web-site. The entire structure of the ecommerce Web-site resides on the digital medium of the server.

Contact center 103 includes a local area network (LAN) 128. LAN 128 has connection to Internet backbone 110 through an Internet router (IR) 108 and a high speed Internet access line 109. LAN 128 provides Internet access to a number of LAN-connected agent workstations manned by human operators or sales and service agents. Each workstation includes a LAN-connected computer and a PSTN-connected telephone. A LAN-connected computer 120 and a LAN-connected computer 121 are illustrated in this example. Agent telephones illustrated in this example include a telephone 122 associated with computer 121 and a telephone 123 associated with computer 120.

Telephones 122 and 123 are connected to a central office telephone switch (CS) 107 by internal telephony wiring 126. Telephone switch 107 is CTI enabled via a CTI server 119 connected to the switch via a CTI link. CTI server 119 is also connected to LAN 128. CS 107 may be a private branch exchange (PBX) switch or some other type of telephone switch. In one embodiment Internet protocol (IP) telephones are provided to agents at each agent station. CTI server 119 provides command control to switch 107 for routing telephone interactions to live agents and automated systems. CTI server 119 may also provide intelligent peripheral services like interactive voice response (IVR) services to switch 107 and other computerized services used in routing.

CS 107 is connected by telephone trunk 106 to local switch (LS) 105 in PSTN 101. In one embodiment LS 105 may also be PBX enhanced by a CTI server connected to server 119 by a digital network. Contact center 103 is responsible, in this embodiment, for providing contact center services in general and, perhaps by contract as a service provider. More particularly, center 103 provides intelligent routing, sales and service expertise to organizations including the organization represented by the exemplary Web site accessible through WS 113.

A universal routing server (URS) 118 is illustrated within contact center 103 and is connected to LAN 128. URS 118 provides intelligent routing strategies resident on and executable from a digital medium on the server or otherwise accessible to the server. Such strategies may be selectively executed according to routing logic (R-Logic) 125 residing on the digital medium associated with the server.

A customer relations management (CRM) server 117 is illustrated within contact center 103 and is connected to LAN 128. CRM server 117 includes a connected database (DB) 124 adapted to store information about customers that the contact center has had experience with. The customer data may include customer profile and contact information, customer purchase histories, customer data related to special programs, and so on. Product and service information may also be stored in CRM database 124. Services provided through contact center 103 may include IVR services, live sales assistance, live technical service, email and other electronic message services, Web-based contact services, and the like.

A message server (MS) 111 and a chat server (CHS) 112 are illustrated within Internet network 102 connected to backbone 110. Contact center 103 may host MS 111, CHS 112, as well as (WS) 113. It is important to note herein that the functions and features of the present invention including contact services and Web hosting may be provided by a third party to an organization through contract. In another embodiment a company may acquire the functions and features of the present invention and may provide in-house contact services and Web hosting.

In practice of the present invention, a Web-site accessible through server 113 is enhanced according to one embodiment of the present invention by providing a real-time eService escalation logic (REEL) 115 resident on the digital medium of the server that is utilized by a ranking module (not illustrated) also resident on and executable from the digital medium associated with Web server 113. REEL 115 may be associated with a resident Web-site structure on the digital medium of the server by providing executable code sets supported by business logic embedded at strategic locations within the HTML structure of the Web site. The code sets are, in one embodiment, executable reporting tags or embedded Java scripts that are executed by the browser (enabled for JAVA Script) of a visitor navigating the Web site. The code-sets are adapted to enable real-time tracking of visitor activity at the enhanced Web-site during visitor navigation of the site.

When a visitor accesses the Web site, the code sets or tags report whenever they are executed by the visitor's browser. The tags may have static values associated with them. In one embodiment a tag value summation process occurs when a visitor invokes more than one tag during interaction at the Web site. The identification of the visitor is determined and all of the values associated with the tags that the user executes are totaled at some point in time during the visitor's navigating. If the total value attributed to the visitor exceeds a threshold set by business rule, then an invitation may be sent to the user in the form of a pop-up window or some other visual indication or visual and audio notification to solicit the Web visitor to engage in a higher-level interaction, which may or may not involve allocation of a live agent. REEL 115 represents the logic supported by conditional business rules that determines the type or types of escalation to offer the Web visitor.

In one embodiment a real-time value indicator is provided for each tracked Web visitor and provides a current value relative to the perceived importance of the customer to the sales process. In one embodiment the indicator is termed a customer agent escalation indicator (CAEI) and is used to determine by value indication when an invitation should be sent to the customer to escalate an interaction that may include live assistance with an agent of contact center 103.

In another embodiment the term customer agent session thermometer (CAST) is used because the escalation logic may, most often and in a preferred embodiment result in some type of live customer/agent interactive session such as a live chat session or a live voice session.

Indicator 114 may be provided in the form of a scalar indicator that shows a measurable indication or for each tracked Web-site visitor of how valuable the visitor might be relative to solicitation to escalate the interaction. Indicator 114 may be a transparent (algorithm) indicator of a value or importance level accumulated by a Web visitor over a period of time that the visitor is tracked on the Web-site. In one embodiment indicator 114 includes a visible interface that may be viewed on a monitor of a computing system that is adapted to monitor Web site traffic. The indicator provides a measure supported by the logic of how important the customer might be at a point in time to relative to investing the cost of allocating a live agent to interact with the customer over the Web-site and/or other channels that might also be available to the customer in place of the Web-site. More particularly, CAST 114 provides a real time indication of whether it would be appropriate to invite a potential customer not currently engaged in a Web-supported transaction process to partake in a higher level interaction available through the site or made available through a separate channel by contact center 103 including the possible allocation of live assistance.

In one embodiment of the present invention, escalating a customer interaction level at the Web site may simply involve increasing the importance of the interactive activity but not necessarily providing live assistance to the interaction. For example, a potential customer simply browsing the Web site might be invited to engage in e-mail correspondence with an agent. Real-time eservice escalation logic 115 may vary widely from Web site to Web site depending on the nature of the Web site including products, services, and the different types of interaction modalities available. It is noted herein that a visitor's interaction with a Web site may be considered a primary interaction whereas a subsequent or concurrent interaction between a visitor and the contact center resulting from escalation invitation and visitor acceptance thereof may be termed a secondary interaction. For example, a visitor may continue to browse the Web site while engaged in a cellular telephone call with an agent from the contact center.

In one embodiment of the present invention no human intervention is required to monitor Web visitors and invite those visitors to escalate their interaction level. The invitations sent to Web visitors may include interactive windows including dialog boxes or Web forms for accepting visitor information ahead of any live interaction with a contact agent. In another embodiment a human operator monitors Web site visitors through a separate interface and can see when a visitor's customer agent session thermometer 114 equals or exceeds the threshold required to warrant escalation of the interaction.

In one embodiment a time limit is applied beginning at detection of a visitor at the Web site within which the visitor must be invited to engage in a higher-level interaction or the visitor is dropped from monitoring. In this embodiment after the time limit expires the visitor is no longer tracked on the web site. Also in this embodiment, no human operator needs to send an invitation. The invitations may be automatically generated in dynamic HTML (DHTML) or other dynamic markup and sent to Web visitors if their discovered value meets a threshold requirement during the limited time they are monitored. In another embodiment there is no time limit that applies to tracking and analyzing visitor behavior at the Web site and Web visitors may be selected for escalation at any time their value indicator determines a threshold has been equaled or exceeded.

If a Web visitor accepts an invitation to an escalation of their interaction the appropriate interface to routing strategy in the contact center is activated. For example, the invitation may be to engage in a telephone interaction with a live agent in the contact center. A 1-800-number may be provided to the visitor through the pop-up interface for the visitor to make a telephone call to the contact center. At the center the visitor may be queued for an available agent. The invitation may be for the visitor to except a call from an agent in contact center 103. In this case the dialogue box would include a field where the visitor may type in any telephone number for the agent call. The information would then be forwarded to contact center 102 and queued for an outbound agent campaign for example. The exact nature of interaction between the customer and an agent will depend on the interaction modes available in the contact center and which of those modes are selected according to which values are indicated at the time of escalation.

In one embodiment the escalation invitations are dynamically formed as described further above according to the logic and current state of resources available in the contact center such as estimated wait time (EWT) in queue, agent availability, agent skill availability, and so on. In one embodiment a Web visitor is not monitored from the start page although the system is aware of the visitor (awareness level of standardized model) but is monitored when the visitor executes some activity associated with exploration or commitment (higher value levels). In this case a traditional model of classifying activity or behavior might be observed. For example, awareness that a visitor is at the Web site might be the first level of the model followed by an exploration level where the visitor begins exploring certain aspects of the site. The most important level might be a commitment level represented by behavior indicating a level of commitment like moving to a purchase page or adding items to a shopping cart.

Monitored visitors of a Web site in server 113 may be solicited according to perceived importance such that the offered services match the level of importance discovered in the visitors' monitored behavior. In this example, all of the Web analytics and logic for ranking a visitor and escalating an interaction are implemented at server side or within server 113. However, routing logic 125 including real time call center statistics such as agent availability may considered before determining the exact escalation options that will be provided to a potential customer.

It is noted herein that it is not required that the logic used to monitor Web visitors and to determine if any will be solicited for interaction escalation be implemented solely at the Web server. In other embodiments different levels of cooperation may be observed between entities involved in enabling the process. For example, a third-party service may provide monitoring and escalation determination while a separate third-party service provides the actual contact services including live interaction. Distribution of logic for monitoring and ranking Web visitors may be negotiated between the entities.

Figure 2:
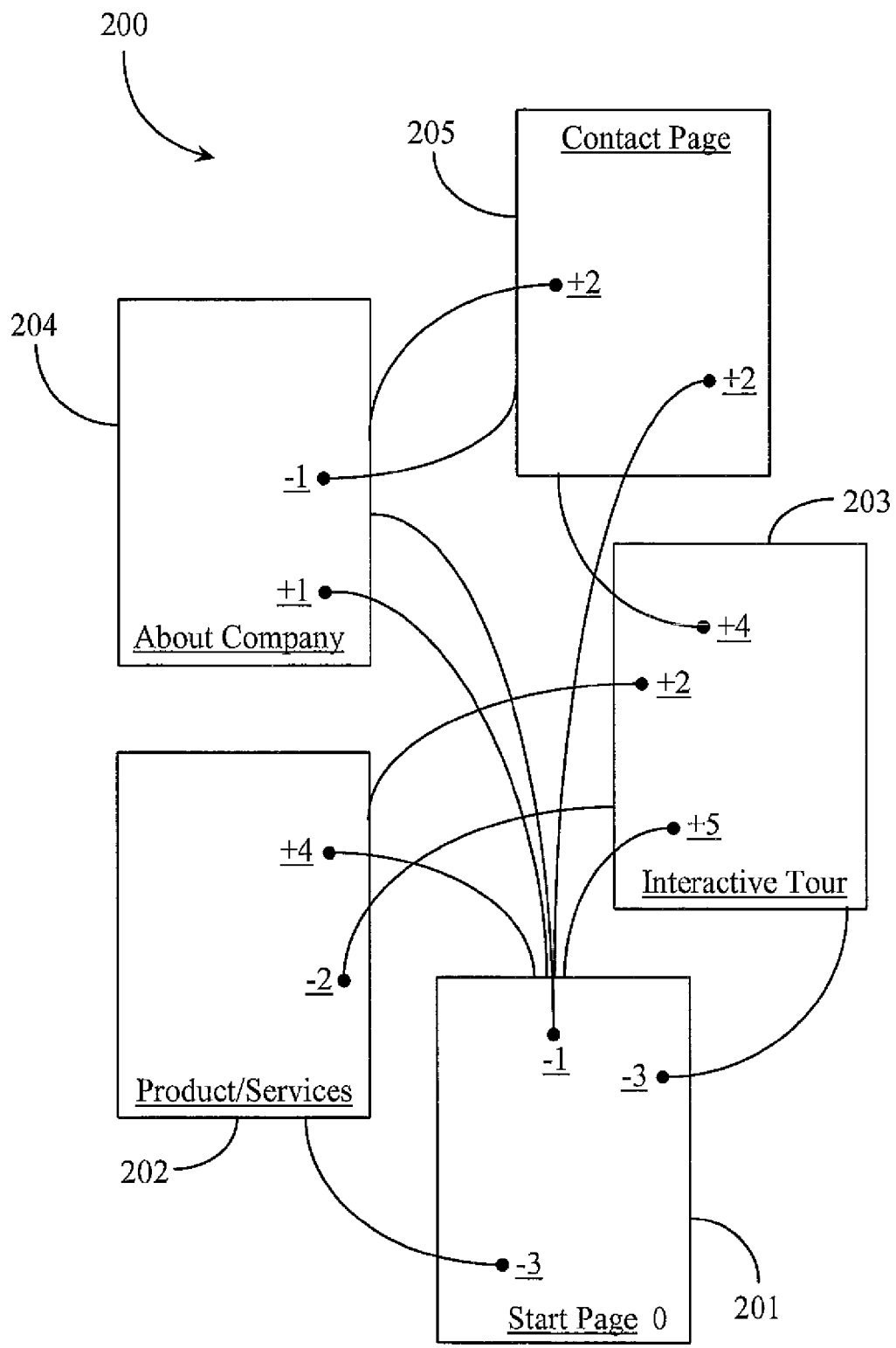
FIG. 2 is a block diagram illustrating visitor ranking values based on site navigation according to an embodiment of the present invention.

FIG. 2 is a block diagram illustrating visitor ranking values based on site navigation of a Web site 200 according to an embodiment of the present invention. Web site 200 is logically illustrated in this embodiment as a collection of Web pages. A start page 201 is illustrated and represents the first page a visitor will see at the Web site. Other web site pages available at the site may include a product/services page 202, page 204 containing information about the company, a page 203 containing an interactive tour, and a contact page containing contact information and links to contact services. A Web transaction page, such as a shopping cart facility or a checkout page is not specifically illustrated in this example. It is not required that the web site make transacting available for the site itself in order to practice the present invention.

In this example, visitor behavior may include presence at a particular Web page or section; navigation or browsing from one page or section to another page or section; link execution of some interactive module such as a flash player, search interface, electronic form, or interactive menu. A Web visitor is not generally restricted in the way the visitor navigates a Web site. A visitor may logon as a customer or not. A visitor may navigate to any available page directly from the start page. The exact number of Web pages and special areas of those Web pages that make up the Web site depend entirely on the planned structure of the web site. There may be as few as one web site page, or multiple Web pages belonging to a same Web site. Moreover, Web presentation logic may very from simple HTML to dynamic HTML and other higher level markups adapted to enable more functional types of interaction.

Code sets or tags embedded in the web page structure are adapted in this case to recognize the identification of the visitor executing the tag through interaction. Visitor information is available through session data available when the visitor accesses the site. In this example, value points are given according to a visitor navigation sequence that takes into account the previous Web page the visitor was on and the current Web page visitor has navigated to. Value points in this case may be specified from a pool of possible values depending on the navigation history of the visitor. In this case a visitor who navigates from start page 201 directly to products/services page 202 receives four points for the activity.

A tag embedded on the product/service page 202 recognizes the visitor when the page is served. Navigation from product/services page 202 directly to interactive tour page 203 adds two points to the total for the visitor giving the visitor 6 points. By comparison, a visitor navigating directly from start page 201 to the interactive tour page 203 receives only five points. A visitor navigating directly from start page 201 to about company page 204 receives only one. Likewise, a visitor navigating from the start page 201 directly to the contact page 205 receives 2 points. A visitor may also lose points in navigating from one page to another. A user moving from the contact page 205 to the about company page 204 loses 1 point. If a visitor on interactive tour page 203 navigates back to the start page 201 he or she loses three points. Similarly, if the user on the product services page 202 navigates back to the start page 201 that visitor loses 3 points.

Real-time eservice this escalation logic 115 described further above with respect to FIG. 1 contains rules that govern which navigation activities are more important than others. In this exemplary embodiment, a web site visitor may gain points and may lose points relative to Web site navigation. In one embodiment of the present invention the code sets or tags embedded in the Web structure are presence tags having fixed values. In this embodiment when a visitor is served a page having embedded tag the user as whatever value as specified by the tag. If the visitor leaves the page and he loses the page value. In one embodiment page values may be added or accumulated for a visitor navigating multiple pages such that if a visitor has thoroughly investigated a site, the visitor will retain the sum of the values of all of the site pages. Other types of behavior monitoring may be practiced using presence code sets or content tags like attributing a value for downloading a picture or for selecting a picture, or for viewing or activating a menu, or for performing a data search, and so on.

Real time eservice escalation logic (REEL) 115 contains the logic for applying values and the rules governing how the values are applied and to what contact services are made available to visitors that are found to be valuable. In one embodiment of the present invention the code sets or tags are reporting code sets or tags that report information to a ranking module not illustrated here but described with respect to FIG. 1. In this embodiment each tag that is activated reports information to a table that can be provided in cache memory of the server hosting the Web site. In the table, a cache line is provided for the visitor that is being tracked such that the tracking information exists in the cache table only while the visitor is being tracked. The number of lines in the cache table equals the number of visitors currently being tracked on the Web site. When a visitor is dropped from monitoring the line for that visitor disappears from the table.

The actual logic and business rules used to enhance the web site for visitor monitoring an escalation may vary greatly according to the type of business, the structure of the web site, nature of contact services available, and perhaps other factors. The logic seeks to aid in determination of whether a web site visitor is valuable enough to lower the risk of intervening in that visitors experience on the Web site for the purpose of redirecting visitor to a higher level of interaction than they are currently experiencing. One with skill in the art will appreciate that where transaction services are available through the Web site and a monitored visitor is engaged in those services, then intervening with that visitor's experience would not be advised unless the visitor was having trouble with services. In such a case if a navigation sequence shows that a visitor has left an important page without completing a task such as a transaction, then a high value may be attributed to that activity according to the assumption that the visitor was attempting to transact but was unable to for some unknown reason.

Figure 3:
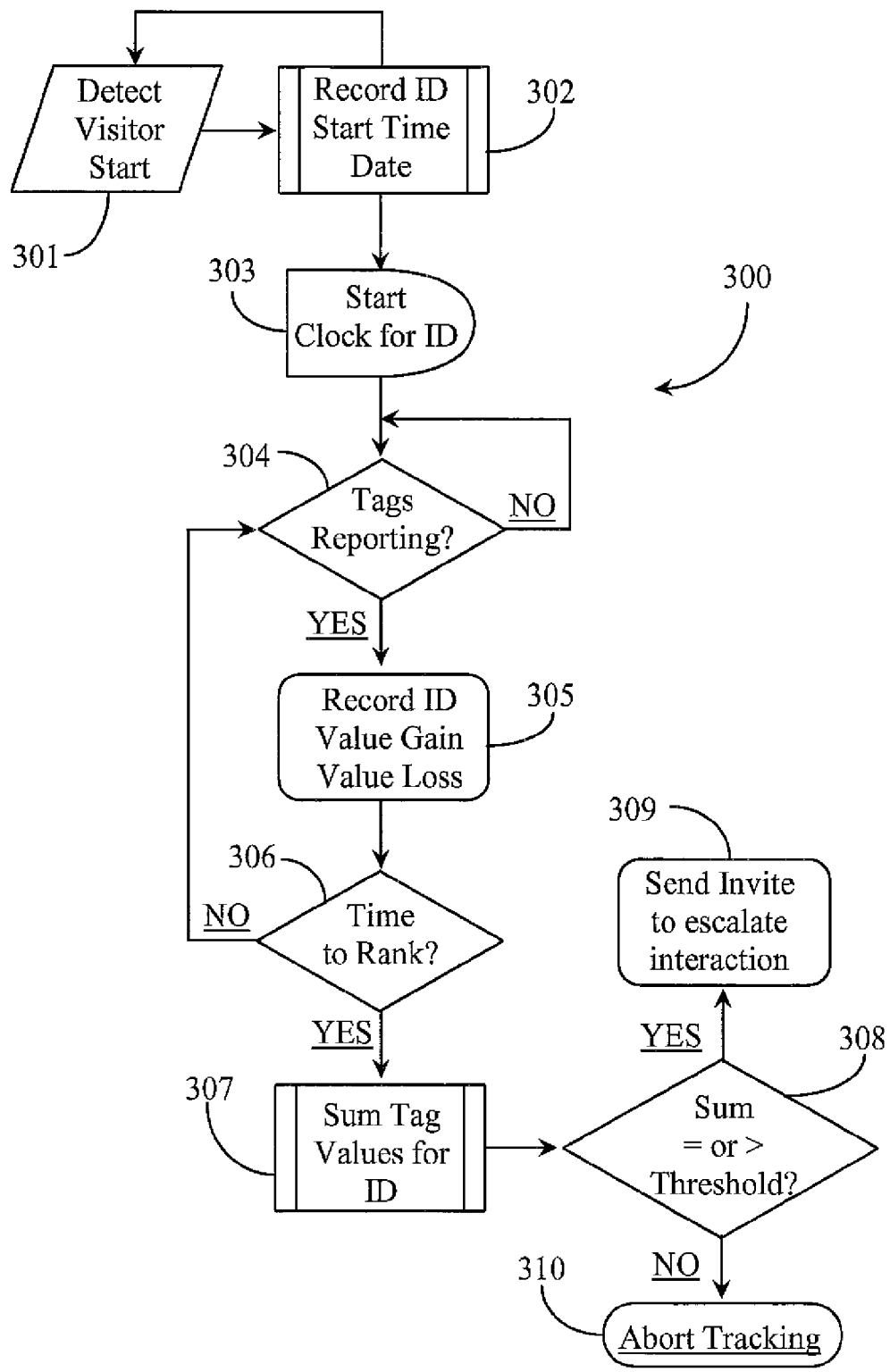
FIG. 3 is a process flow chart illustrating steps for ranking a Web visitor for possible interaction escalation according to an embodiment of the present invention.

FIG. 3 is a process flow chart illustrating steps 300 for ranking a Web visitor for possible interaction escalation according to an embodiment of the present invention. At step 301 the system detects a visitor on the start page of the web site. The presence of a new visitor on the start page can be detected by monitoring the server connection. Each visitor at the web site will have a unique IP address. The system may therefore separately identify each visitor on the web site at any given moment. Step 302 system records the visitor identification and start time and date into a table analogous to the cache table described further above. The steps including 301 and 302 are repeated for each visitor that logs onto the web site.

At step 303 the system may start a clock for each visitor entered into the table. This step is not required in order to practice the present invention. In one embodiment a time-to-live (TTL) for the visitor is observed in the table for the purpose of optimization. A TTL for a Web-visitor tracking session may depend on the nature of the company and site. For example, there may be many, even hundreds, of potential customers logged onto a site or there may only be a few potential customers logged onto a site. The average time a visitor stays connected to a Web site may be very long for one type of site and very short for another type of site. If an average time a visitor stays connected to a site is 10 minutes then one would hope to provide an escalation of interaction were appropriate well before the 10 minutes is lapsed. Therefore, a TTL for visitor tracking for that Web site might be around ½ of the average time or about 5 minutes.

At step 304 the system may determine if any tags are currently reporting. At step 304 if there are no tags currently reporting the process loops back until tags begin reporting. At step 304 if it is determined that one or more tags are reporting, then at step 305 information relevant to the visitor executing the tag may be recorded into a data table such as an identifier, a value gain or a value loss for that tag. A tag reports when a browser executes the tag. The executed tag may record session ID number, an IP address, and other information relevant to the activity such as the time, date, and a value which may be a presence value attributed to the tag or a value selected from a pool of values based on the navigation sequence including the current page and the previous tagged or known page the visitor was served. For example, start page=0 points. From start page to contact page=2 points gained. From contact page to interactive tour page=4 points gained. The total tag value for the visitor after the sequence of activity is 6 points. There may be a determined time at which a system check of value or score of a visitor and comparison of that score to a threshold is performed to determine if an escalation invitation will be presented to the visitor. If there is a TTL then the pint of determination will be at the end of that time.

This process assumes a TTL for the tracking period of each visitor which is the same time period for all visitors tracked on the site. At step 306 the system determines if it is time to rank anyone. This decision may be triggered at the pending expiration of a tracking period for a visitor. For example, if a tracking period TTL is 5 minutes and a tracked visitor having at least one line in the data table is approaching 5 minutes being tracked the system may determine that is time to rank that visitor at step 306. Otherwise the process loops back until it is time to rank a visitor.

At step 307 the system may rank the visitor by summing the current values accumulated by the visitor through Web activity including navigation between pages, and/or other activities determined as part of the tracking process. At step 308 the system may make a determination as to whether the value result of step 307 is equal to or exceeds a preset value set as a threshold value for a visitor summed for possible escalation. If at step 308 it is determined that the visitor is not valuable to the point of meeting or exceeding the pre-set threshold, then at step 310 the system abruptly aborts tracking the visitor and all data about the visitor in the temporary cache table is purged. No further attention is paid to the visitor. He or she may continue browsing the site or may log off of the site without fan fare.

At step 308 if the system determines that the visitor is valuable enough to meet or exceed the pre-set threshold, then an escalation of the interactive experience of the visitor is sought through solicitation of the visitor at the site using electronic pop-up notification or other electronic notification modalities. The same exact sequence happens with every tracked visitor, some getting escalation invites and others being ignored according to ranked value. The escalation logic may also include logic that specifies from a variety of possible interaction modalities that may be selected according to rank. For example, a pre-set threshold may set the line at which escalation is triggered. After the threshold is breeched, additional value points might be used to determine what kind of escalation will be attempted. A chat invite might be determined appropriate for a visitor whose value is found equal to the threshold value while an outbound call may be deemed appropriate for a value that is 2 points above the threshold.

All of the invitation option windows are linked to active contact center services and viability of any of the options may be subject to state determinations at the time of consideration. For example, an inbound call invitation where a 1-800-number is provided to the visitor to call the contact center might be replaced by an outbound call invitation where the service asks for a telephone number of the visitor for an agent running an outbound call campaign if there are no available agents for the inbound queue but there are available agents running an outbound campaign.

The reason for switching the modalities might have to do with a real-time assessment made of agent availability. Another consideration might be to send a chat invite to a number of qualifying Web-site visitors to enter an ongoing or ad-hoc chat session manned by one or more live agents who can "route off" individuals from the chat room to one-on-one service when and if deemed appropriate. A top consideration is always the agent's time and how it is used. Another top consideration is the visitor state of being. The logic should not impose on a visitor that might otherwise complete a self-help transaction such as a Web purchase successfully and without human intervention; rather the logic seeks to enhance the visitor's experience at the Web site in a way that is helpful to the visitor but not distractive to a visitor.

Figure 4:
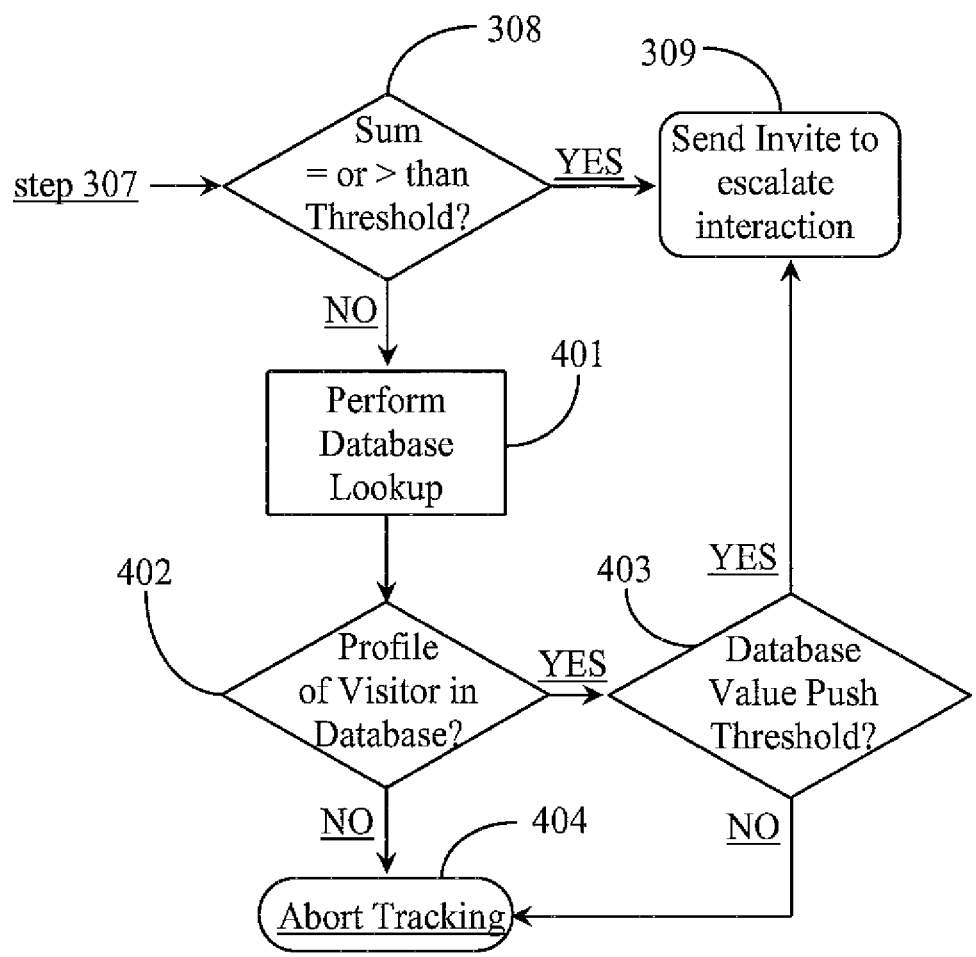
FIG. 4 is a process flow chart illustrating alternative steps added to the process of FIG. 3 for ranking a Web-site visitor for possible interaction escalation.

FIG. 4 is a process flow chart illustrating alternative steps 400 added to the process of FIG. 3 for ranking a Web-site visitor for possible interaction escalation. Leading on from FIG. 3 step 307 culminates at step 308 where the value summed for a visitor is compared to a threshold value pre-set by the company. As described in FIG. 3, if at step 308 the total value summed for the visitor is equal to or surpasses the threshold value, then an invitation may be sent to escalate the interaction. If at step 308 the system determined that the value sum for the visitor was not equal to or greater than the threshold, then optionally at step 401 a database lookup might be performed at the contact center in a customer database like a CRM database to see if the profile of the Web visitor is already known to the center.

If at step 402 the information is not known to the contact center then tracking may be immediately aborted at step 404. If however, a profile of the visitor is available, a value may be attributed to the visitor's information or history already known to the center. For example, points may be given for a long term customer who has always paid their bills. If at step 402 it is determined that the center "knows" the visitor, at step 403 the system determines if the value attributed to the in-house knowledge of the visitor added to the value of the activity of the visitor together finally equals or surpasses the threshold value.

If at step 403 the value from knowing the visitor and the value of the visitors activity meets or breaks the threshold value then the process may resolve at step 309 where the invite to escalate is sent to the visitor. In one embodiment a check of contact center information might be made earlier in the value ranking process.

It will be clear to one with skill in the art of automated processes that the entire visitor monitoring and ranking process may be executed within the Web server environment and may be made wholly automated without departing from the spirit and scope of the present invention. In another embodiment some human intervention may be leveraged to visually monitor CAST values where manual invite and routing initiation is practiced from an adjacent but connected computer system. In a fully automated environment, visitor acceptance of an invite automatically triggers the appropriate routing strategies at the contact center as would be the case through linked Web contact services represented at the site by interactive icons.

Figure 5:
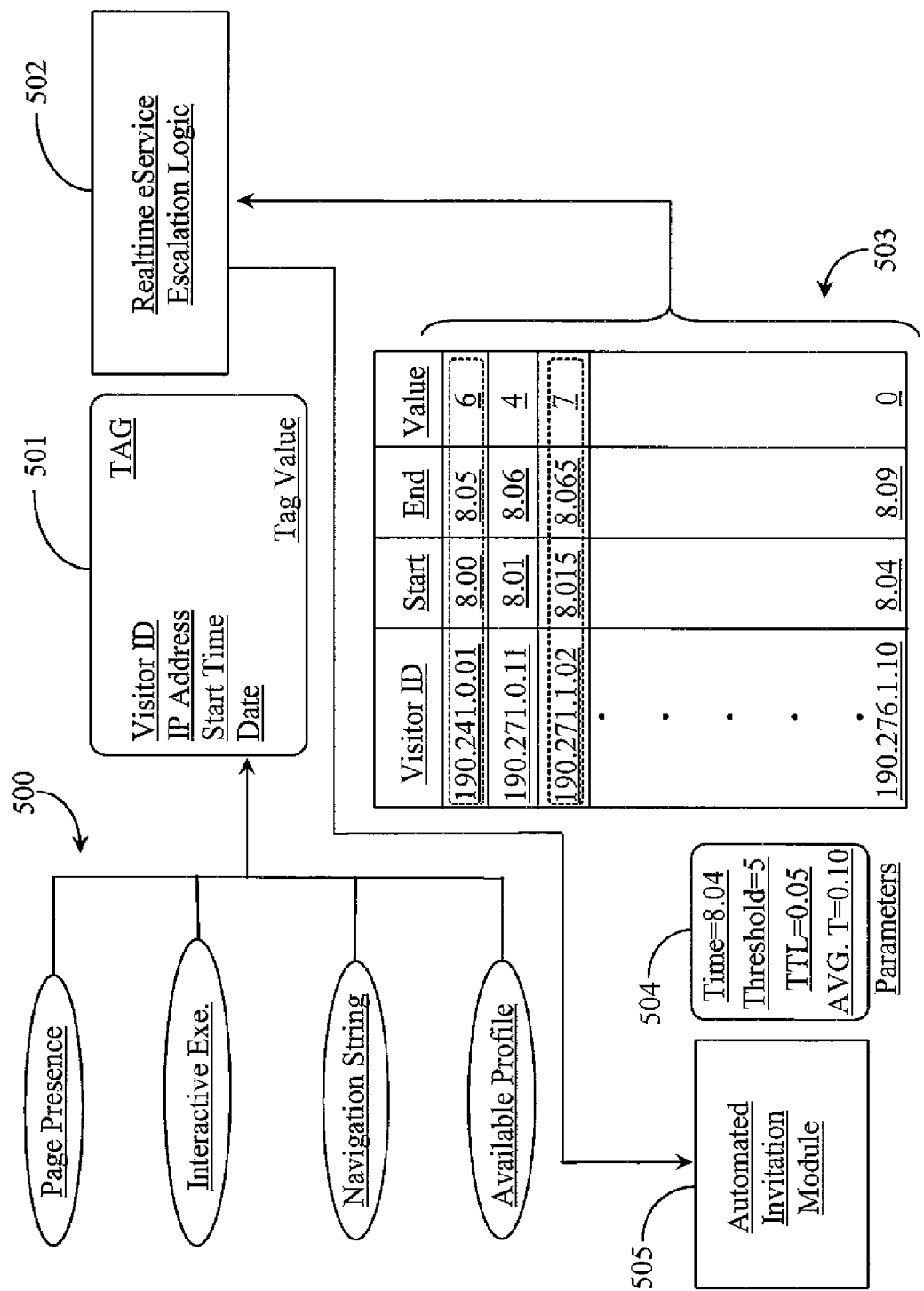
FIG. 5 is a block diagram illustrating a table-based tracking system operating on a digital medium for ranking Web-site visitors and for inviting visitors to escalate their interactive experience according to an embodiment of the present invention.

FIG. 5 is a block diagram illustrating a table-based tracking system operating on a digital medium for ranking Web-site visitors and for inviting visitors to escalate their interactive experiences according to an embodiment of the present invention. In this example, tags or code-sets such as tag 501 are provided and embedded in strategic portions of a Web site architecture where presence or activity might be considered revealing of visitor emotional state or propensity to acquiesce to the sales process.

A tag such as tag 501 might include a script for recording visitor identification like a computer name, serial number, or session identification. The IP address assigned to the Internet appliance used to access the server may also be used to uniquely identify the visitor. The tag may record the start time (time the tag was read) and the date. A tag value might be recorded or it might be a generic property of the tag. The tag value might be and most likely is a numerical value that can be summed with other tag values. Running values may be kept in a dynamic table.

Tag value attributes 500 may be applied to the value of a tag. For example, page presence on a specific Web page recorded by tag may command a static value built into the tag that is the same value for all visitors to the page. An interactive executable may also carry a tag and a tag value such that when a visitor executes the interactive, the visitor attributes and tag value are recorded or reported. A search interface might be an example of an interactive interface on the Web page that may be tagged. When a visitor invokes the search interface a value may be attributed to the invocation and specific searchable categories at the Web site may also be tagged to add value. In a voice application running on an IVR server, tags may be embedded and invoked according to visitor response to prompting. For example, if a visitor selects one of two available branches in a process value points may be added for the selection.

In one embodiment a Tag on a Web page dynamically applies a specific value based on a discovered navigation string of more than one Web page of the same Web site. In this embodiment a Tag accounts for the current page and the previous page served to the visitor. In this way a value determination is made based on the navigation string or sequence with the idea that some importance level can be attributed to a potential customer from the navigation path taken at the site. The sequence may take into account two or more than two Web site pages served. In one embodiment an available profile of the visitor may be known to the contact center and may be looked up when the visitor first enters the Web site. Log-in information may be used in the lookup or simply one of the identifiers attributed to the user that repeats whenever the user accesses the site like a cookie or an IP address.

Tag 501 may report information every time it is invoked or read by a browser. Information may be reported to a ranking module 502 that leverages Realtime eService Escalation Logic stored locally on a digital medium available to the site. Depending on the configuration, a tag value may be static or the same value every time the tag reports or a value may be calculated by the ranking module based on a rule available in REEL. Both in a static and in a dynamic value assignment model more than one tag being invoked may result in an accumulation of value points for a visitor. A visitor may gain and/or lose value while navigating the Web site during tracking depending on exact logic and rule.

A data tracking table 503 may be provided for a Web site to visually track the visitors in real time while they are on the site. The table may be a dynamic cache table where each visitor on the site and invoking tags occupies a cache line in the table. In this example table 503 has a single line representing each visitor. Columns are provided for categorizing the values expressed on a cache line. From left to right the columns are labeled Visitor ID, Start, End, and Value. The visitor ID is an IP address in this example.

Table 503 has some constant parameters 504 that characterize operation of the table. One of these is a running indication of the actual time. Another parameter of the table is a value threshold. In this example it is the numeral 5. On a scale of 1 to 10, for example, 5 may represent a threshold at which some escalation activity is warranted. In this embodiment each tracking session has the same time to live (TTL) in the system. The TTL is the time that is spent tracking a visitor. In this example the TTL is 0.05 or 5 minutes. The average time that a visitor spends on the Web site is also expressed in the table and is 0.10 or 10 minutes in this example. Parameters 504 may be very different in different Web site embodiments. The reason for adding a time constraint to the table 503 is simply to ensure that escalation is offered to any visitors found valuable before they leave the Web site.

Ranking module 502 may also provide final value ranking and modality selection for escalating a visitor's experience at the Web site in addition to logic for value accumulation and summing values for the visitor during site activity. The ranking module in this example will act to determine an escalation strategy when a value for a visitor meets or exceeds threshold requirements as evidenced in table 503 at the exact time of expiration of tracking (end of TTL) for that visitor. In table 503 the first line is the oldest line and if the running time is 8.04 then one minute remains before the value is assessed. For visitor 190.241.0.0 the current value is 6 exceeding the threshold. It is possible though that the value drops to below the threshold before the next minute expires. In one embodiment ranking module 501 is a JAVA servelet.

In one embodiment there is no tracking period and all visitors are tracked as soon as they enter the Web site and tracking ceases for a visitor only when the visitor is no longer connected to the site. In this case whenever the visitor's value meets or exceeds a threshold value set for escalation, an escalation strategy for that visitor is pursued. In such an embodiment a total value gauging visitor importance may increase to match or overtake the threshold value where an invitation to escalate is sent to the visitor and where the visitor declines or does not accept the offer. If the value then dips below the threshold and the visitor continues navigating the Web site, another invite may be sent if the value again rises to match or exceed the threshold during the same Web session with the server.

In one embodiment that is wholly automated, ranking module 502 determines based on value indication from table 502 that an escalation attempt will be tried for a visitor. Depending on the logic and, in some cases, availability status of live resources at the contact center, ranking module 502 causes an invitation module 505 to send an automated invite to the visitor, most likely to appear as a pop-up notification in the visitor's browser interface.

REEL may be dynamic in that it may be integrated with current business logic and routing logic running within the contact center so that realtime availability status, queue wait time estimation, and other dynamic states can be considered before selecting the modality of escalation subject of the invitation. For example, if there are no agents available, or with the appropriate skill set, to handle an incoming call from the visitor, but there are active agents running an outbound call campaign that could use some more call numbers to be added to the automated call list, then module 505 would invite the visitor to accept a telephone call from a live agent. At the agent end, a special notification might indicate that the call is one from a Web visitor that was dynamically integrated into the automated outbound call list on an outbound call server (OCS).

It will be apparent to one with skill in the art that the methods and system of the present invention can be used in an HTML/HTTP Web-site browser-based embodiment where the reporting tags are embedded in the structure of the Web page and perhaps within certain interactive executables available through the Web site.

One with skill in the art will then appreciate that the same realtime eservice escalation logic may be used at a Web site enabled for Voice XML Web browsing by visitors who visit the site using a telephone through a voice server running a VXML browser and the appropriate voice recognition and text-to-speech software. In such a case, the code sets or tags embedded in the Web site structure would have equivalent code sets or tags incorporated within the VXML documents representing the Web services that are accessed through the voice browser via telephone instead of through a tradition HTML browser. In this case escalation invitations sent by module 505 are VXML documents that are read to the user via the voice browser using synthesized voice. If the visitor accepts an initiation verbally or by pushing a button on the telephone, for example, a routing strategy involving a live agent and the accepting visitor may be executed automatically wherein a live agent may replace the IVR interaction during the same phone session. Other modalities of interaction are also available including computer-based modalities if they are available at both ends of the interaction.

Figure 6:
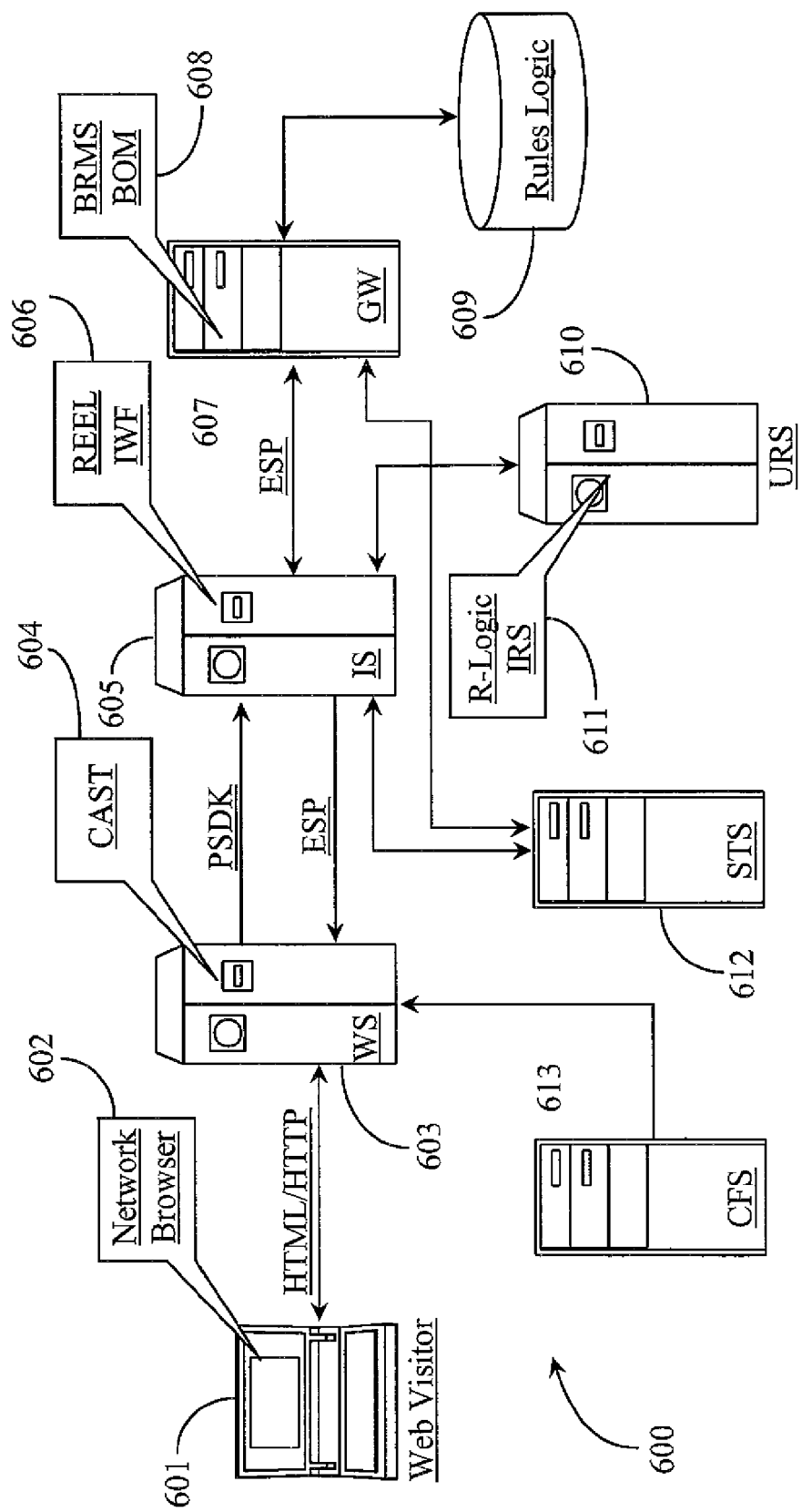
FIG. 6 is an architectural overview of a proactive engagement system according to another embodiment of the present invention.

FIG. 6 is an architectural overview 600 of a proactive engagement system according to another embodiment of the present invention. Architecture 600 illustrates various components that might be provided for a more robust and complex service where logic is distributed between two or more entities. A Web visitor 601 is illustrated logically herein as a connected laptop running an instance of a network browser 602. In this example the session between the visitor's machine and a Web server (WS) 603 uses HTML/HTTP protocols typical of a Web session channel. In one embodiment, the visitor 601 uses a telephone and the Web server deploys a VXML browser that the user interacts with to navigate the Web site via voice application launched by an interactive voice response (IVR) server (not illustrated).

WS 603 has Customer Agent Session Thermometer (CAST) 604 running there on and adapted to provide indication of each tracked visitor's temperature (value) relative to importance for monitoring the visitor for possible escalation. In this case CAST only determines if a visitor deserves to be monitored. In a J2EE embodiment CAST 604 communicates with a JAVA servlet (not illustrated). The JAVA servlet actually monitors and reports visitor behavior on the Web site as reported to the servelet by Java script embedded in the Web site structure.

Web server 603 may be accessed by a configuration server (CFS) 613 for the purpose of adapting Web sites for practice of the present invention. What is different from this example and the example of FIG. 1 is that WS 603 is connected to an Interaction server 605 maintained by a third party that is adapted to determine the escalation parameters for tracked Web site visitors and to provide the ranking for escalation purposes. Real time escalation logic (REEL) 606 is running on Interaction server connected to the Web server over the Internet network. The functionality includes creating virtual interaction events expressed in Interaction Workflow (IWF) resulting from notification of tracked visitors from Web server 603. When CAST determines a visitor needs to be monitored, it sends a proprietary submit command to the Interaction server which will eventually rank the visitor and escalate the interaction of the visitor if the ranking warrants it. In this case Platform Software Development Kit (PSDK) protocol is used to communicate submissions through a PSDK "submit" command and status updates through a PSDK "update" command known to the inventors. Other proprietary or non-proprietary protocols available to the inventors may be used.

In this case, the interaction server contains the ranking module (not illustrated). Monitoring of each Web visitor is performed at Web server 603, but results are sent to Interaction server 605 after the initial events were established by way of PSDK updates for each visitor. Therefore, any number of IWFs (business and routing processes) may be running in server 605 each workflow process running for a monitored visitor. The ranking module may keep a dynamic table for storing the parameters and running value totals of each workflow.

In this example, the ranking module is encapsulated in the IWF process for each monitored visitor such that if the process determines that a visitor deserves escalation (ranked to satisfactory requirement) the process invokes an Interaction Routing Strategy (IRS) routing strategy based on the escalation logic that will determine what type of escalation will be attempted with a specific visitor. In this case, a Universal Routing Server (URS) analogous to URS 118 of FIG. 1 is provided and connected to IS 605. URS 610 is running Routing (R)-Logic and IRS 610. IRS process is invoked when a visitor is determined a candidate for escalation in IS 605.

A statistics server (STS) 612 is provided and is adapted to contain realtime statistics about the contact center resources such as EST for agent queues, skill set availability (skill-based routing); agent availability, etc. URS 610 may access statistics for determining a preferred escalation routing strategy for any one visitor. Determination may be aided by a business rules management server (BRMS) gateway (GW) 607. GW 607 provided access to rules-based logic in repository 609. GW 607 runs BRMS software and BOM software 608. Access to the external business logic and rules needed to make intelligent determinations of navigation and behavioral activity is enabled by a proprietary protocol known to the inventor as External Service Protocol (ESP). For example, URS 610 may access GW 607 and applicable rules logic indirectly through the ESP.

A decision on whether or not to escalate an interaction is made in this example by Interaction server 605. If an escalation invitation is ordered for a monitored Web visitor, IS 605 may notify WS 603 and may include a dynamically generated invitation containing an escalation option or options determined by routing strategy and business logic. WS 603 may serve the notification to Web visitor 601 during the normal course of interaction. An invitation to an escalated interaction might be selected from a pool of possible invitations stored in a digital medium accessible to WS 603 and server 605 sends only a message telling WS 603 which invitation to send. The logic and corresponding business processing may range from very simple presence triggered logic to much more sophisticated logic where values are calculated and other information is considered in both ranking and escalation including call center stats, customer history information, customer profile data, and so on.

When visitor 601 receives an invitation to escalate the visitor may accept the invitation or reject the invitation. If the invitation is accepted, some interaction workflow occurs and the WS event becomes a CC event for live interactive servicing. Secondary interaction is handled in IS 605 and incorporates normal routing routines and strategy for establishing the secondary interaction between the visitor and the live agent. For example, outbound escalations resulting from Web session monitoring and ranking can be seamlessly integrated into a normal outbound calling list used by an outbound call server (OCS). A Web visitor may simply reject invitations to escalate at which at some point monitoring the individual would become non-productive and would stop. A rejection may only be temporary where the invitee may spell out what he or she requires from the company before moving forward.

In another embodiment of the present invention a Web server may be monitored by one entity that provides all of the escalation and ranking, logic and determination to escalate while another entity provides interaction services according to intelligent routing determinations. The methods and system of the invention can be used in a variety of electronic interactive systems beside the Internet network without departing from the spirit and scope of the present invention. The invention may be used in Interactive television to rank certain customer or visitor behaviors discoverable by monitoring interactive inputs made by the remote control. If a visitor selects or begins surfing pay per view (PPV) channels the system may rank the visitor highly and may offer an escalation to a live agent for the purpose of helping the customer purchase a package or at least the video in question. Automated transaction systems and other menu-selective network processes hosted electronically can be adapted to practice the invention.

It will be apparent to one with skill in the art that the visitor ranking system and methods of the invention may be provided using some or all of the mentioned features and components without departing from the spirit and scope of the present invention. It will also be apparent to the skilled artisan that the embodiments described above are exemplary of inventions that may have far greater scope than any of the singular descriptions. There may be many alterations made in the descriptions without departing from the spirit and scope of the present invention.

What is claimed is:

1. A system for managing Web traffic interactions, the system comprising:
  a processor; and
  a memory coupled to the processor, wherein the memory stores instructions that, when executed by the processor, cause the processor to:
    detect a visitor interacting with a web site;
    start a clock for an active session associated with the visitor;
    assign a point value for the visitor in response to the visitor navigating to a first web page associated with the web site;
    track the point value for the active session associated with the visitor for a predetermined tracking period;
    identify a first amount for adding to the point value assigned for the visitor in response to the visitor navigating to a second web page associated with the web site;
    identify a second amount for subtracting from the point value in response to the visitor navigating to a third web page associated with the web site;
    calculate a total point value after adding the first amount to the point value and subtracting the second amount from the point value;
    compare the total point value with a threshold value to determine whether or not the total point value exceeds the threshold value after the predetermined tracking period ends;
    transmit a signal to initiate a communication between an agent device associated with the web site and an electronic device associated with the visitor in response to the point value exceeding the threshold value;
    determine whether or not the visitor navigating from the first web page to the second web page satisfies a criterion for escalating an interaction to a live agent, and wherein modifying the point value comprises increasing the point value in response to determining that the criterion is satisfied; and
    determine whether or not the visitor navigating from the first web page to the second web page satisfies a criterion for escalating an interaction to a live agent, and wherein modifying the point value comprises decreasing the point value in response to determining that the criterion is not satisfied.

2. The system of claim 1, wherein the instructions further cause the processor to make a real-time assessment of current resources of a contact center associated with the agent device in response to the point value exceeding the threshold value.

3. The system of claim 1, wherein the instructions further cause the processor to record a visitor identification attribute of an active session associated with the visitor, perform a database lookup for a profile corresponding to the visitor identification attribute value, and, if the corresponding profile is found, modify the point value assigned for the visitor based on the corresponding profile.

4. The system of claim 1, wherein the instructions further cause the processor to modify the point value assigned for the visitor based on at least one tag value associated with an action of the visitor on the web site.

5. The system of claim 1, wherein the instructions further cause the processor to transmit an invitation to the electronic device associated with the visitor to engage in the communication.

6. The system of claim 5, wherein the invitation comprises a pop-up message or an audible message.

7. The system of claim 5, wherein the instructions cause the processor to transmit an invitation to a live human-assisted interaction when the point value exceeds another threshold value.

8. A method for managing Web traffic interactions, the method comprising:
  detecting, by a processor, a visitor interacting with a web site;
  starting, by the processor, a clock for an active session associated with the visitor;
  assigning, by the processor, a point value for the visitor in response to the visitor navigating to a first web page associated with the web site;

tracking, by the processor, the point value for the active session associated with the visitor for a predetermined tracking period;

identifying, by the processor, a first amount for adding to the point value assigned for the visitor in response to the visitor navigating to a second web page associated with the web site;

identifying, by the processor, a second amount for subtracting from the point value in response to the visitor navigating to a third web page associated with the web site;

calculating, by the processor, a total point value after adding the first amount to the point value and subtracting the second amount from the point value;

comparing, by the processor, the total point value with a threshold value to determine whether or not the total point value exceeds the threshold value after the predetermined tracking period ends;

transmitting, by the processor, a signal to initiate a communication between an agent device associated with the web site and an electronic device associated with the visitor in response to the point value exceeding the threshold value;

determining, by the processor, whether or not the visitor navigating from the first web page to the second web page satisfies a criterion for escalating an interaction to a live agent, and wherein modifying the point value comprises increasing the point value in response to determining that the criterion is satisfied; and determining, by the processor, whether or not the visitor navigating from the first web page to the second web page satisfies a criterion for escalating an interaction to a live agent, and wherein modifying the point value comprises decreasing the point value in response to determining that the criterion is not satisfied.

9. The method of claim 8, further comprising making, by the processor, a real-time assessment of current resources of a contact center associated with the agent device in response to the point value exceeding the threshold value.

10. The method of claim 8, the method further comprising recording a visitor identification attribute of an active session associated with the visitor, performing a database lookup for a profile corresponding to the visitor identification attribute value, and, if the corresponding profile is found, modifying the point value assigned for the visitor based on the corresponding profile.

11. The method of claim 8, further comprising modifying, by the processor, the point value assigned for the visitor based on at least one tag value associated with an action of the visitor on the web site.

12. The method of claim 8, further comprising transmitting, by the processor, an invitation to the electronic device associated with the visitor to engage in the communication.

13. The method of claim 12, wherein the invitation comprises a pop-up message or an audible message.

14. The method of claim 12, wherein the invitation comprises an invitation to a live human-assisted interaction when the point value exceeds another threshold value.

* * * * *